United States Patent [19]

Sharpe et al.

[11] Patent Number: 5,371,493

[45] Date of Patent: Dec. 6, 1994

[54] RADIO PAGING RECEIVER WHEREIN PROGRAMMING INFORMATION IS READOUT FROM A DISCARDABLE DATA CARD INSERTED THEREIN

[75] Inventors: Anthony K. Sharpe; Andrew D. McPherson, both of Cambridge, England

[73] Assignee: U.S. Philips Corporation, New York, N.Y.

[21] Appl. No.: 957,576

[22] Filed: Oct. 7, 1992

[30] Foreign Application Priority Data

Oct. 14, 1991 [GB] United Kingdom ............... 9121759

[51] Int. Cl.$^5$ .................... G08B 5/22; H04M 17/00; H04B 1/06
[52] U.S. Cl. .................... 340/825.34; 340/825.44; 340/825.33; 379/357; 379/57; 455/186.1
[58] Field of Search .................... 340/825.34, 825.44, 340/825.26, 825.27, 311.1, 825.33; 455/38.1, 38.2, 89, 186.1; 379/130, 131, 144, 157, 357, 57

[56] References Cited

U.S. PATENT DOCUMENTS

| | | | |
|---|---|---|---|
| 4,878,051 | 10/1989 | Andros et al. | 340/825.44 |
| 5,012,234 | 4/1991 | Dulaney et al. | |
| 5,049,874 | 9/1991 | Ishida et al. | 340/825.27 |
| 5,109,540 | 4/1992 | Dzung et al. | 455/89 |
| 5,134,717 | 7/1992 | Rasmussen | 455/186.1 |
| 5,266,782 | 11/1993 | Alanärä et al. | 379/144 |

FOREIGN PATENT DOCUMENTS

| | | | |
|---|---|---|---|
| 0499246 | 8/1992 | European Pat. Off. | 340/311.1 |
| 3822848 | 1/1990 | Germany | 379/357 |
| 63-1251927 | 3/1988 | Japan . | |
| 2207269 | 1/1989 | United Kingdom . | |
| 2211050 | 6/1989 | United Kingdom . | |

OTHER PUBLICATIONS

T. Holmes & T. Rudy, "Multiple Programmable Frequencies/codes/Coding Protocols/Associated Options User Selectable Coverage Areas", Oct. 1990, vol. 11, pp. 67.

Int. Exhibition and Conf. London, 27 Feb.–1 Mar. 1990, pp. Q1–Q13, "Smart Card Technology applied to the future European Cellular Telephone on the digital D–Network".

*Primary Examiner*—Donald J. Yusko
*Assistant Examiner*—Mark H. Rinehart
*Attorney, Agent, or Firm*—Leroy Eason

[57] ABSTRACT

A communications receiver such as a radiopager derives information which is necessary for operation thereof from a discardable read-only data card which is inserted therein. Such information may include a radio identity code (RIS) for relating the receiver to a particular user, and prepaid credit units which are cancelled by the receiver based on the number of received messages or time intervals of operation thereof. The information may also include a particular frequency and data rate for adapting the receiver to operate on a paging system used in a particular country. Once the information on the data card has been read-out and stored in a non-volatile store, the card can be removed and either discarded or recharged with new credit units upon payment of a fee at an authorized station. The receiver may be adapted for use in a different country simply by inserting a data card relating to that country, paying for usage of the receiver as the user goes from country to country.

7 Claims, 2 Drawing Sheets

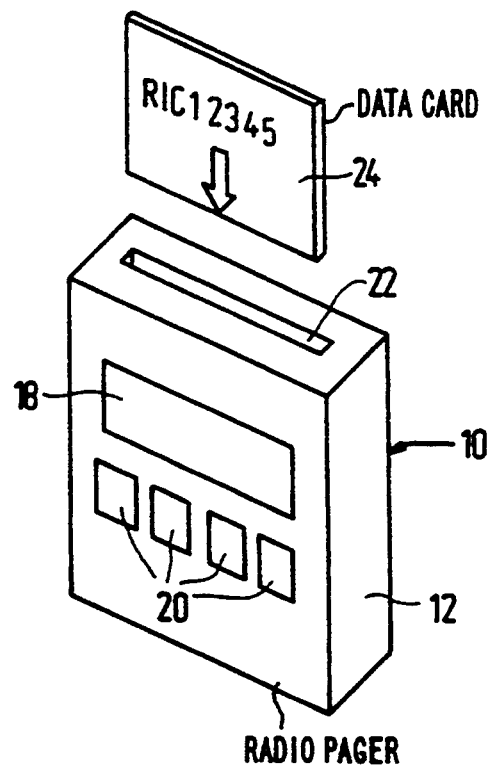
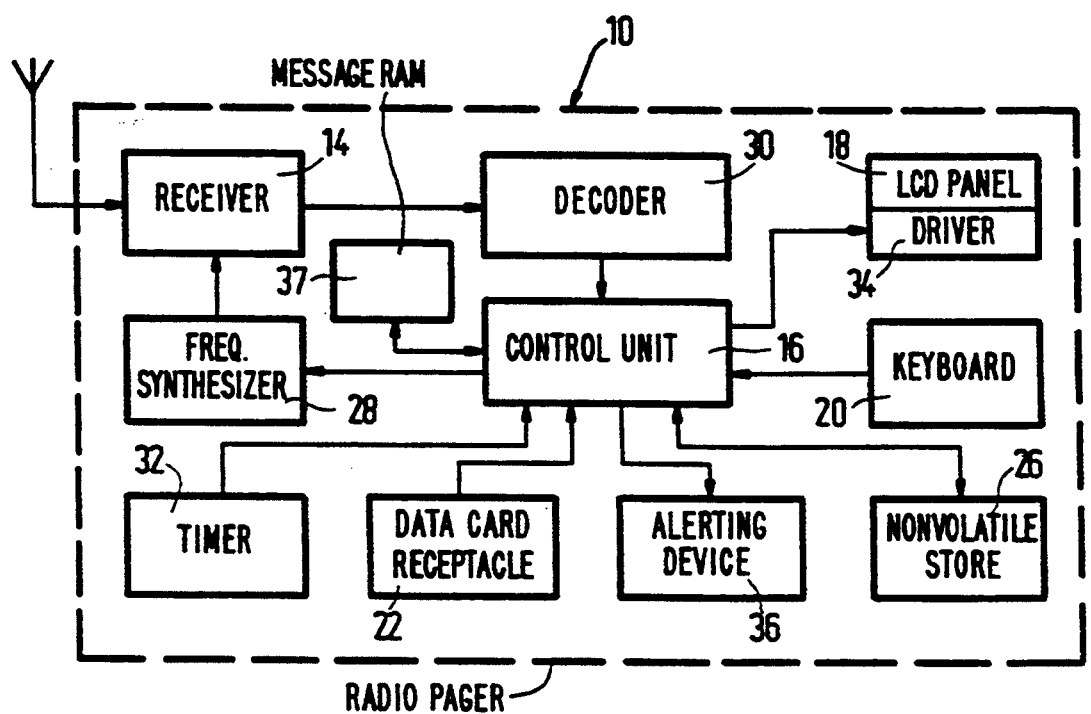
FIG.1
FIG.2

RADIO PAGING RECEIVER WHEREIN PROGRAMMING INFORMATION IS READOUT FROM A DISCARDABLE DATA CARD INSERTED THEREIN

BACKGROUND OF THE INVENTION

1. Field of the Invention

The present invention relates to a communications receiver for receiving messages, such as a radiopager. In the present specification the term radiopager refers to a communications receiver for receiving only an address codeword or an address codeword together with concatenated data message codewords. Normally such receivers are not able to transmit signals, although what is termed answer-back radiopagers are becoming available. For convenience of description, the invention will be described in terms of its use in a POCSAG or CCIR Radiopaging Code No. 1 system the details of which system are described in "*The Book of the CCIR Radiopaging Code No. 1*," available from Secretary RCSG, British Telecom, Radiopaging, 23 Howland Street, London, W1P 6HQ, United Kingdom. However the teachings of the invention are not system dependent and could readily be applied to radiopagers operating in accordance with the Golay or ERMES radiopaging protocols.

2. Description of the Related Art

In the United Kingdom, POCSAG digital radiopaging services are provided by several network providers. However the service providers also supply radiopaging receivers to the end user and bill the customer at periodic intervals, such as every 3 months. When supplying a radiopager, a service provider writes a radio identity code (RIC) or address in a non-volatile store included therein. The RIC uniquely links that radiopager with the particular user. Thus, in operation, if the radiopager detects its RIC in the relevant predetermined frame of a transmitted batch, it remains energised to provide an audio, visual and/or tactile alert indication to the user, and when appropriate will store message data which is concatenated with the RIC address codeword. The service provider will also adjust the receiver to receive signals in the relevant frequency channel, the bit rate being already predetermined by the POCSAG protocol. The radiopager as delivered to the end customer is then able to operate within the receiving range of transmitters operated by a predetermined network provider.

At the present time many countries have their own national digital paging systems based on POCSAG. However, because of the likelihood of the same RIC being issued to a different pager in each country, and each country operating its paging system on a different frequency or frequencies, it is not usually possible for a user to take a normal UK digital radiopager to another country which is also on the POCSAG system and use it there. Furthermore, no arrangements currently exist for billing users who cross national boundaries.

A number of PTTs and other network providers in Europe operate Euromessage, which is an attempt to provide a degree of international paging coverage within certain parts of Europe, primarily the major cities. Euromessage operates on a single frequency at UHF, and requires a user to hire a radiopaging receiver from a service provider. It also requires the user to indicate, several weeks in advance of his departure, those countries in which the user wishes to be paged. Drawbacks to Euromessage are that it is relatively inflexible, is not comprehensive in its coverage of the respective countries, and requires a user to have to carry a second radiopaging receiver in addition to that usable in his home country.

SUMMARY OF THE INVENTION

An object of the present invention is to provide more flexibility in the use of radiopagers.

According to one aspect of the present invention there is provided a communications receiver having means for receiving and loading-in data relating to the operation of the receiver from a device which is removably insertable into the receiver.

According to a second aspect of the present invention there is provided a device for use with the receiver in accordance with the present invention, which device comprises storage means containing data relating to the operation of a receiver.

In one embodiment the radiopager is a standard receiver which has not had a RIC embedded in it by a service provider. However the insertable device, which may be a card, stores a RIC which is assigned to the card together with credit information comprising prepaid credit units. By inserting the card into the radiopager the RIC together with the credit units are loaded into respective storage locations in the radiopager, which then confirms that the information has been received. The card, which has been erased, is then withdrawn. A user has then to inform his office of the new RIC or access code, which may be printed on the card, in order that he can be paged. The prepaid credit units are debited in accordance with the usage of the radiopager, which usage might be related to the number of paging calls addressed to, and received by, the radiopager, or the period(s) of time during which the radiopager is available to receive paging calls. When the credit units have been exhausted the user has a number of options, for example to obtain a new card with its own RIC or access code and prepaid credit units, to take the original card to a suitable office or a shop where the credit units are recharged on payment, or to have a supply of cards having the same RIC or access code and prepaid credit units. The use of such cards with radiopagers means that both items can be obtained from any authorized retail outlet and not just from an established service provider. Additionally, because the credit units are prepaid, the service provider is relieved of having to bill the user at regular intervals.

In another embodiment the radiopager is capable of adapting its operating characteristics, such as its frequency, and, if applicable, its data rate, in response to information loaded into it from a suitable card which has stored therein not only such information but also a RIC and prepaid credit units. When such information has been loaded in, the radiopager is thereby adapted to receive calls from a paging system operating in a particular area or country.

If the radiopager has sufficient storage space information from two or more such cards can be loaded it. Such information includes operating characteristics of systems in difference geographical areas. When a user is in a particular area, say France, he selects a card for France and the radiopager adapts itself according to the information loaded in from the French card. On crossing into Germany the user then selects a card for Germany and the radiopager adapts itself accordingly. The prepaid credit units associated with one country cannot be used in another country should the credit units for the latter country be exhausted.

If desired the radiopager may be capable of receiving encrypted messages, but in order to decode them an encryption key is required. Such a key may be provided by an insertable card which is erased during loading of the key into the radiopager. If, at the base station, the encryption key is changed, then the user of a radiopager has to insert a card having the new key in order to be able to receive paging alerts and/or messages.

The use of prepayment cards, credit cards and bank cards for the payment of telephone calls is known per se, but such cards do not provide the telephone unit with an identity by which it can receive calls.

It is also known from a conference paper "*Smart Card Technology Applied to the future European Cellular Telephone on the digital D-Network*", read at the Smart Card '90 International Exhibition and Conference, PLF Commun, 3 Vol. 332 PP, pages Q1 to Q13, Vol. 2, 1990 that in order for a user to be able to use his GSM radiotelephone it must have a Subscriber Identity Module (SIM) inserted therein in order to be able to operate. A user carrying his SIM with him is then able to roam internationally through the GSM system and make calls via any telephone unit simply by inserting his SIM. Billing is done by debiting the user. However, a SIM does not provide the possibility of prepayment of credit units to avoid billing, does not have its own RIC as opposed to that of a user, and does not adapt the radiotelephone to the radio transmission characteristics of a country in which it is to be used.

BRIEF DESCRIPTION OF THE DRAWINGS

The present invention will now be described, by way of example, with reference to the accompanying drawings, wherein:

FIG. 1 is a sketch drawing illustrating a radiopager and a device consisting of a card in which is embedded information to be loaded into the radiopager in order to enable it to operate, FIG. 2 is a block schematic diagram of a radiopager.

In the drawings the same reference numerals have been used to indicate corresponding features.

DESCRIPTION OF THE PREFERRED EMBODIMENTS

Figure 3:
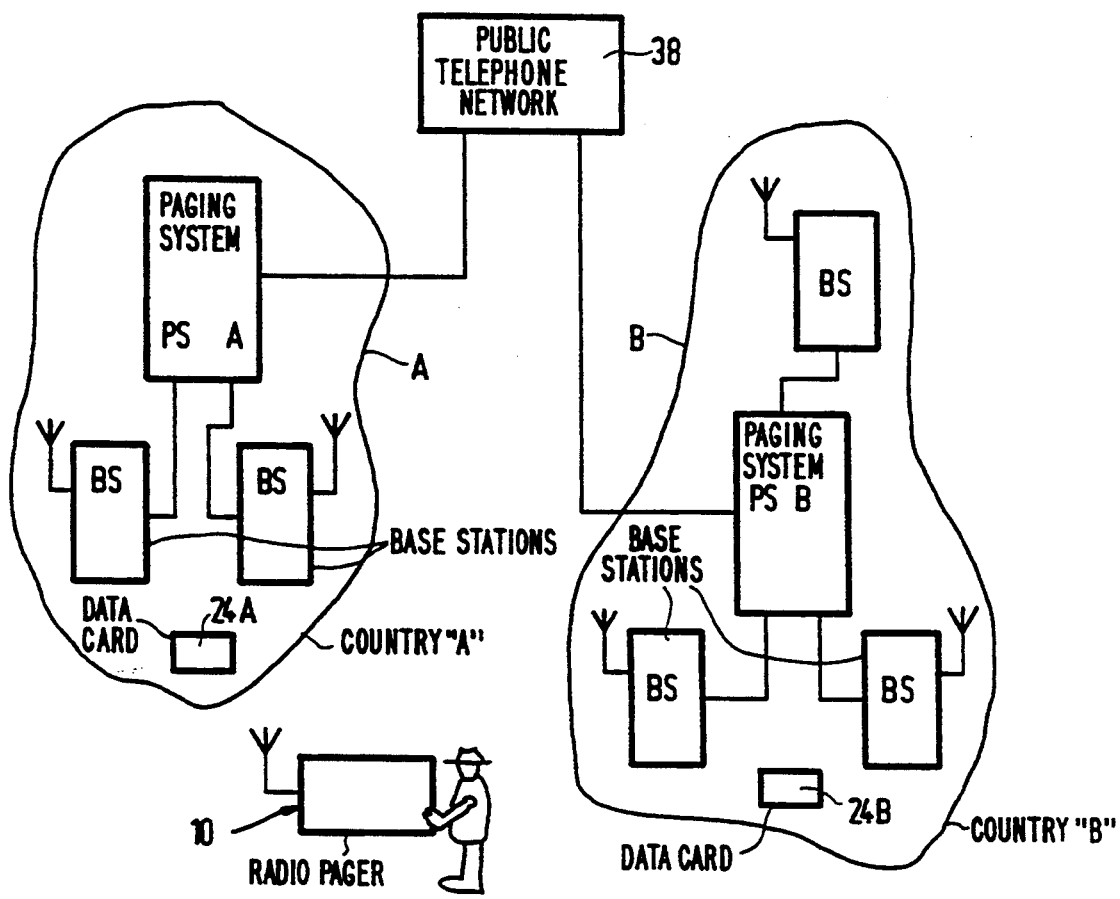
FIG. 3 is a sketch illustrating one method by which the radiopager can be used in different geographical areas.

The radiopager 10 shown in FIGS. 1 and 2 comprises a housing 12 which contains a radio receiver 14 and a controller 16. A liquid crystal display (LCD) panel 18 is provided in a wall of the housing 12 together with a plurality of pushbutton switches 20 which are used to select various operating modes of the radiopager 10. A socket 22 is provided in a wall of the housing 12 for receiving a device, such as a card 24, which contains information such as a RIC, prepaid credit units, and, depending on its application, frequency, data rate and other operating information which will be required by the radiopager 10 in order for it to operate. The card 24 is inserted into the socket 22 and the information it contains is loaded into a non-volatile store 26 under the control of the controller 16. The store 26 is electrically alterable and may comprise an EEPROM. The completion of the loading in of the information is confirmed by the radiopager displaying on the LCD panel 18 a confirmation message which may contain the RIC, number of credit units, and optionally a system or country code.

The radiopager 10 includes a frequency synthesiser 28 which produces a local oscillator frequency which is supplied to the receiver 14. The local oscillator frequency may be varied as required by means of the controller 16. A decoder 30 is connected between an output of the receiver 14 and an input to the controller 16. The purpose of the decoder 30 is to adapt a received paging signal coded according to the specified standard into a form which is suitable for use by to the controller 16. A timer 32, LCD drivers 34 and an audio, visual and/or tactile alerting device(s) 36 are connected respectively to the controller 16.

In one mode of operation, a user of the radiopager 10 obtains a card 24 from any suitable retail outlet, which card has a RIC, access code and prepaid credit units embedded in it. The user inserts the card 24 into the card receptacle 22 and the RIC and the number of credit units are read therefrom by controller 16 and loaded into the store 26. The successful completion of transfer of this information is indicated on the LCD panel 18. The card is then discarded, as the information has been erased. Finally, the user then has to inform, say, his office, of his current RIC or access code.

In use the radiopager 10 is energised for its respective transmission frame according to the specified standard and, if a paging message is received, it is decoded and the address codeword is compared with the current RIC by the controller 16. If they match the alerting device 36 is energised and, where applicable, any message codewords are stored in a RAM 37. If debiting is done on a per call basis, then the number of credit units is reduced by one unit after each call received. Alternatively, if debiting is done on a time basis, then upon switching on the radiopager 10 the timer 32 increments the time and after a predetermined time interval has elapsed the controller 16 deducts one credit unit from the number held in the store 26.

When the number of credit units has expired various options are possible. For example, the user goes to a retail outlet and purchases another card which has its own RIC, access code and credit units, and inserts this card into the socket 22 to loads in the new RIC and the prepaid credit units. He then has to inform say his office, of his new RIC or access code.

Frequent changes of RICs may be avoided if credit units on the card are rechargeable on payment of a fee, or if a batch of cards each having the same RIC and access code are purchased and held by the user and/or his office.

This simple mode of operation has the advantage that the user can purchase his radiopager and cards from any suitable retail outlet and is not dependent on a service provider who may not be open for business. Also billing is avoided and the user has some control over the cost of operating his radiopager-currently in Great Britain service providers charge monthly fees which are independent of the degree of usage and number of calls received.

FIG. 3 illustrates a mode of use where, for example, countries A and B have POCSAG digital paging systems which operate on different frequency channels. In order to be able to use the same radiopager 10 in both countries, the local oscillator frequency produced by the frequency synthesiser 28 must be such as to enable the paging signal to be received. Accordingly, the card 24 contains not only a RIC or access code and credit units suitable for the country concerned, but also frequency data which the controller 16 can supply to the synthesiser 28 so that it generates the appropriate local oscillator frequency.

Thus when in country A, which will be regarded as the home country, the user purchases a card 24A and loads in the required information which is used to adapt the radiopager 10 accordingly. As before, the user notifies his office of his RIC or access code. Whilst in country A, the user can be paged by way of a paging system PSA and its associated base stations BS.

When the user travels to country B, he purchases a card 24B and loads in a new RIC or access code, credit units and frequency information for country B and notifies his office in country A of his RIC or access code. The radiopager 10 is now only able to accept paging calls from the paging system PSB in country B. If such calls are from his office in country A, they are relayed by the paging system PSA and the international PSTN network 38 to the paging system PSB.

Depending on the level of sophistication of the radiopager, various implementations are possible to cover a radiopager which roams outside the area of one paging system and into the area of another paging system.

For example, referring to FIG. 3, the insertion of the card 24B can erase not only the RIC but also the unused credit units relating to country A, and vice versa when a subsequent card 24A is inserted.

Alternatively, if the store 26 is large enough it may be able to store simultaneously RICs, credit units and frequency information on a per country. In that case, basis when a user arrives or before his arrival, in a particular country either he buys a relevant card and loads the information into his radiopager 10, or if such information is already stored therein and there are unused credit units, he uses the pushbutton keyboard 20 to select operation for the country concerned.

In a further refinement, if the radiopager has been preloaded with information relating to two or more countries for which is has unused credit units; then the controller 16 can, by adapting the receiver characteristics on an empirical basis, automatically set the radiopager for reception of paging messages from the local paging system in the country concerned.

Credit units are stored on a per paging system basis and only debited when used on that system. For example, credit units for use on system PSB(FIG. 3) cannot be used in the event the radiopager 10 is operating on the system PSA and has exhausted the number of credit units it has for that system PSA.

A practical problem which may occur when using RICs which are embedded in cards is how long an interval should be allowed to elapse before issuing a card with an identical RIC. This problem can occur because there are a large but finite number of RICs and therefore the number of cards with different RICs is not limitless. If the same RIC has been issued two or more times and the respective radiopagers are in credit, then without some precautions being taken a paging request can be accepted by the pager system for anyone of them and its transmissions can be received by all those pagers having the same RIC.

One method of reducing the incidence of multiple transmissions is for the card to be limited to a certain life, say for 6 months or for a predetermined number (e.g. 100) of paging messages, after which time or number of messages its registration at the paging system terminal is deleted.

A method by which the registration is deleted after a predetermined period of time will now be described. The card includes a RIC, an access code and a registration number. When the user purchases a new card he loads in the pager specific RIC and other information as described previously. At that point in time, the timer 32 (FIG. 2) has not yet been set, and can only be set by the user registering with the paging system by telephoning the registration number and giving the RIC or access number. The pager system then sends an initiating paging message to the radiopager 10 on the new RIC. The radiopager 10 will respond only to the initialising message, and on receipt thereof the timer 32 begins to count for a predetermined duration, say 6 months. At the same time the paging system records the time it sent the initiating message. At the end of the predetermined duration the paging system refuses to accept any more calls for that RIC or access number, and also the radiopager 10 can indicate that its current RIC has expired. The system can now sanction the issuing of another card having the same RIC.

In the case of authorisation of a predetermined number of calls, then the paging system monitors the number of paging calls which have been transmitted. To be viable, the authorisation will also contain a time restriction such as 100 calls in 6 months.

This method may not prevent a pager which still has the same RIC as has been reissued from receiving paging calls meant for someone else who has the reissued RIC. However, this problem can be overcome by the timer erasing the RIC stored in the controller 16 so that it cannot thereafter receive anything except a specific initiating message after insertion of new/updated card data.

Another use for information stored on an insertable card is to decrypt encrypted messages by a the card having the currently used encryption key, which card is loaded into the radiopager. If the paging system changes the encryption key monthly, then new cards will have to be issued monthly if the user is to continue to be able to decrypt encrypted messages sent to his radiopager.

From reading the present disclosure modifications will be apparent to persons skilled in the art which may involve other features already known in the design, manufacture and use of radiopagers and component parts thereof and which may be used instead of or in addition to features already described herein. Also, although claims have been formulated in this application to particular combinations of features, it should be understood that the disclosure may include features or combinations of features which may not relate to the same invention as claimed in any claim; and may or may not mitigate any or all of the same technical problems as does the present invention. The applicants hereby give notice that claims may be formulated to such features and/or combinations of such features in further applications.

We claim:

1. A radio receiver for use in a radio paging system, said receiver comprising:
   receiving means for down-converting and decoding a received radio signal having a selected frequency, to thereby derive received information from said signal;
   control means for controlling the operation of said receiver in accordance with a stored program of instructions, said control means being coupled to said receiving means to set it to said selected frequency in accordance with said stored program and to receive the received information from said receiving means;

output means controlled by said control means to produce an indication of the received information to a user of said receiver;

means coupled to said control means for receiving a discardable read-only data card containing information for use in carrying out the stored program of said control means; and electrically alterable non-volatile storage means coupled to said control means;

said control means being adapted to destructively read-out the information in said read-only card and no store said information in said non-volatile storage means.

2. A receiver as claimed in claim 1, wherein the information contained in said read-only data card includes information relating to a radio frequency and reception protocol applicable to a particular geographical area, said information upon read-out from said card being stored by said control means in said non-volatile storage means.

3. A radio receiver as claimed in claim 1, wherein the said electrically alterable non-volatile storage means may store information relating to radio frequency and reception protocols applicable to at least two different geographical areas.

4. A radio receiver as claimed in claim 1, wherein the received information derived from a received radio signal includes an address code, the information contained in said data card includes at least one radio identity code which upon read-out from said card is stored by said control means in said non-volatile storage means, and said control means is adapted to compare the address code of a received radio signal with the radio identity code stored in said non-volatile storage means in order to determine whether the received radio signal is addressed to said receiver.

5. A radio receiver as claimed in claim 1, wherein said data card contains prepayment information relating to authorized usage of said receiver, said pre-payment information is read-out from said card and stored by said control means in said non-volatile storage means, and said control means is adapted to debit the stored prepayment information in accordance with extent of usage of said receiver.

6. A receiver as claimed in claim 5 wherein said control means comprises timing means for debiting the stored prepayment information in accordance with time of usage of the receiver.

7. A receiver as claimed in claim 1, wherein the information contained in said data card includes an encryption key which upon read-out from said card is stored by said control means in said non-volatile storage means, and said control means is adapted to use the stored encryption key in carrying out said stored program.

* * * * *